United States Patent

Leifer et al.

[15] 3,697,016

[45] Oct. 10, 1972

[54] TAPE LOADING AND UNLOADING MECHANISM

[72] Inventors: Noel Arthur Leifer, Pine Brook; Henry Walter Ott, Fairfield, both of N.J.

[73] Assignee: Bell Telephone Laboratories, Incorporated, Murray Hill, Berkeley Heights, N.J.

[22] Filed: April 21, 1971

[21] Appl. No.: 136,126

[52] U.S. Cl. ....................242/189, 242/75.43, 318/7

[51] Int. Cl........B65h 59/38, B65h 63/02, G03b 1/04

[58] Field of Search..........242/189, 190, 75.3, 75.42, 242/75.43, 75.44; 226/195; 318/7

[56] References Cited

UNITED STATES PATENTS

| | | | |
|---|---|---|---|
| 3,130,936 | 4/1964 | Rochman | 242/75.3 |
| 3,232,546 | 2/1966 | Ferrand et al. | 242/189 |
| 3,311,280 | 3/1967 | Larson et al. | 226/195 |

*Primary Examiner*—Leonard D. Christian
*Attorney*—R. J. Guenther and Kenneth B. Hamlin

[57] ABSTRACT

In a tape transport including the proposed tape loading-unloading mechanism, multiple-loop tape-storage arms are automatically retracted for tape loading and unloading, and then returned to normal operation about their associated predetermined null positions. Multiple-loop tape-storage arms are especially useful in high acceleration tape transports. The combination including an arm tension spring, a roller, a cam further including an elongated slot, and the reel motor-brake assembly is utilized during normal operation of the arm about its predetermined null position and during the arm retract-return sequence. Commercially available tape loading-unloading mechanisms require additional components, such as a motor, which remain idle during normal operation of the tape transport, in order to effect the retract-return function.

8 Claims, 2 Drawing Figures

INVENTORS N. A. LEIFER
H. W. OTT
BY J. P. Kearns
ATTORNEY

TAPE LOADING AND UNLOADING MECHANISM

FIELD OF THE INVENTION

This invention relates to tape transports and, in particular, to transports which include multiple-loop tape storage arms and means for retracting the arms for tape loading and unloading.

BACKGROUND OF THE INVENTION

Several prior art tape transports include tape-storage devices in the form of multiple-loop tape-storage arms for maintaining constant tension on the tape. In order to facilitate the loading and unloading of tape from such transports, mechanisms have been provided for retracting the arms for tape loading and unloading and for thereafter returning the arms to normal operation about their associated predetermined null positions. Such prior art tape loading-unloading mechanisms require additional components, such as a motor, which remain idle during normal operation of the tape transport, in order to effect the retract-return function.

It is therefore an object of this invention to provide a mechanism for facilitating the loading and unloading of tape from a tape transport which includes multiple-loop tape-storage arms.

It is another object of this invention to provide a mechanism which retracts such multiple-loop tape-storage arms for tape loading and unloading and which thereafter returns the arms to normal operation about their associated predetermined null positions.

SUMMARY OF THE INVENTION

According to the present invention, a tape loading-unloading mechanism for retracting a multiple-loop tape-storage arm for tape loading and unloading and then returning the arm to normal operation about its predetermined null position substantially comprises a spring for applying tension to the arm, a cam rotatable with the arm and including an elongated slot, a roller movable within the slot and attached to the end of the spring whereby during normal operation of the arm about its predetermined null position the roller stably sits at one end of the slot and whereby during loading and unloading of the tape the roller stably sits at the other end of the slot. Means for retracting the arm includes means for establishing a second null position beyond the fully retracted position of the arm whereby the reel motor associated with the arm causes the reel to withdraw tape from the arm and whereby the roller moves from the one slot end to the other slot end, and means for shutting off the reel motor when the arm substantially reaches its fully retracted position. Means for returning the arm to normal operation about its predetermined null position includes means for moving the roller from the other slot end towards the one slot end, and means for applying power to the reel motor thereby causing the reel to release tape to the arm and allowing resumption of normal servo operation.

According to a specific embodiment of the present invention, the supply reel and the take-up reel each have associated therewith tape-storage devices which include multiple-loop tape-storage arms. In addition, the means for establishing the second null position further includes a resistor-capacitor combination, while the means for moving the rollers from the other slot ends towards the first slot ends further include solenoid-fork assemblies. Further, the means for shutting off the reel motors does not act until the two arms are substantially in their fully retracted position, while the means for applying power to the reel motors does not act until both solenoid-fork assemblies are fully operative.

It is a feature of this invention that a substantial number of components utilized during normal operation of the tape transport are also utilized to effect the retract-return function.

It is another feature of this invention that reel motors are not shut off until both arms are substantially in their fully retracted position and that thereafter power to the reel motors is not applied until both solenoid-fork assemblies are fully operative.

It is an advantage of this invention that it facilitates the loading and unloading of tape from a tape transport which includes multiple-loop tape-storage arms.

It is another advantage of this invention that it requires only a few simple and inexpensive parts to provide the automatic load-unload feature in a conventional tape transport which utilizes multiple-loop tape-storage arms.

DESCRIPTION OF THE DRAWING

The above and other objects, advantages, and features of this invention will be better appreciated by a consideration of the following detailed description and the drawing in which.

DETAILED DESCRIPTION

Figure 1:
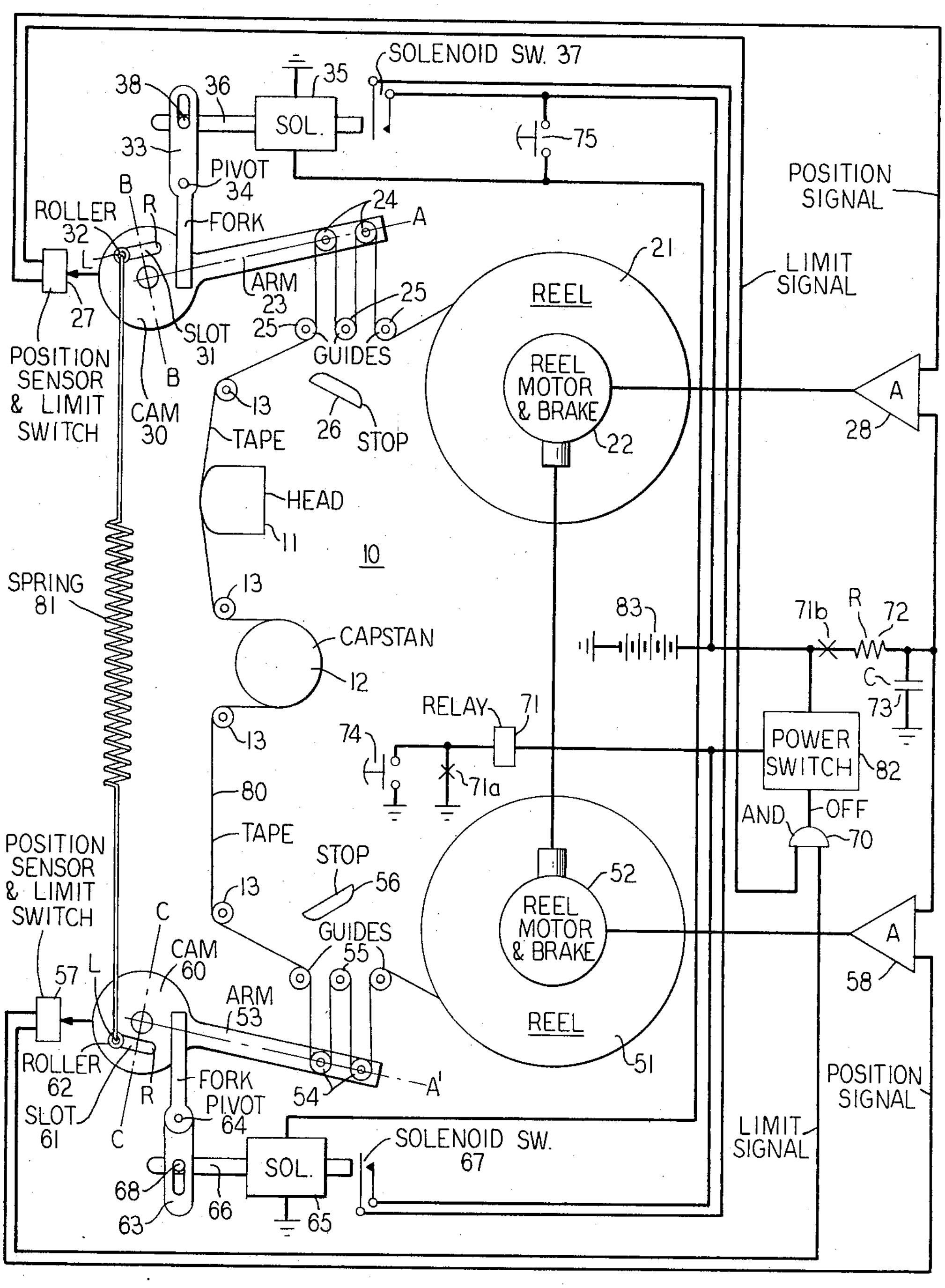
FIG. 1 is a schematic view which shows a tape transport including the tape loading-unloading mechanism of the present invention wherein the position of the multiple-loop tape-storage arms and the relay contact states are those which correspond to normal record or playback.

Referring to FIG. 1, tape transport 10 comprises tape supply reel 21, tape take-up reel 51, information processing station or head assembly 11, capstan 12, and suitably placed tape guides 13 wherein capstan 12 controls the motion of tape 80 past head 11 during normal operation for enabling data transfer to and from the tape. Tape 80 can be of either the magnetic or perforated type. Reels 21 and 51 are rotatably mounted on the housing of transport 10, while capstan 12 is rotatably driven by a motor, not shown. Associated with reel 21 is motor-brake assembly 22 and a tape-storage device which includes multiple-loop tape-storage arm 23, movable tape guides 24 attached to arm 23, and stationary tape guides 25. Similarly, associated with reel 51 is motor-brake assembly 52 and a tape-storage device which includes arm 53, movable tape guides 54, and stationary tape guides 55. Motors 22 and 52 are electrically-driven, reversible motors.

As is well known in the prior art, the tape-storage devices isolate their respective reels from the rapid acceleration and deceleration of tape 80 past head 11 by allowing the reels enough time to rotatably respond to such rapid changes in the velocity of tape 80. In other words, arms 23 and 53 each provide a reserve amount of tape so that the rotational inertia of reels 21 and 51, respectively, need not be instantaneously overcome during rapid starts and stops of tape 80 relative to head 11. To accomplish this result, reel 21 has further associated therewith cam 30 which includes elongated slot 31, roller 32, which is movable along slot 31, angular position sensor 27, and servo amplifier 28. Similarly, reel 51 has further associated therewith cam 60 which includes elongated slot 61, roller 62, which is movable along slot 61, angular position sensor 57, and servo amplifier 58. Arms 23 and 53 are held in tension by spring 81 and have common centers of rotation with their respective cams.

Sensors 27 and 57 measure the angular position of arms 23 and 53 relative to their associated predetermined null positions, designated by dashed direction lines A and A' herein, and respectively feed a position signal to amplifiers 28 and 58, which, in turn, respectively control motor-brake assemblies 22 and 52. In this particular embodiment, rollers 32 and 62 are attached to the ends of tension spring 81; however, separate springs individually associated with rollers 32 and 62 and each having one end secured to the housing of transport 10 could be utilized. It is therefore apparent that reel 21 is rotatably driven by motor 22, which, in turn, is responsive to angular position sensor 27, while reel 51 is rotatably driven by motor 52, which is responsive to angular position sensor 57. The operation of the feedback system including the arms, the position sensors, the servo amplifiers, and the motor-brake assemblies is well known in the art. During normal operation, tape transport 10 is advantageously powered from a single power supply or battery 83 via power switch 82, which is turned ON.

It should be noted that during normal operation, tape 80 is supplied by supply reel 21 to its associated tape-storage device which includes tape-storage arm 23 and that tape 80 is taken up by take-up reel 51 from its associated tape-storage device which includes tape-storage arm 53. Further, capstan 12 draws tape from the tape-storage device which includes tape-storage arm 23 and provides tape to the tape-storage device which includes tape-storage arm 53.

To retract arm 23 away from its predetermined null position designated by the direction line A, a button, not shown, is pressed to close switch 74 thereby energizing relay 71. Before this step capstan 12 is normally but not necessarily brought to a standstill. Energization of relay 71 results in it being latched, or kept in the energized state, via relay contact 71*a* (shown in detached form) which closes. During this time, power switch 82 remains turned ON. Simultaneously with the latching of relay 71, relay contact 71b closes thereby resulting in the slow application of an offset null signal from battery 83 through the combination comprising resistor 72 and capacitor 73 to servo amplifier 28. The difference between the offset null signal and the signal from position sensor 27 drives motor 22 which causes reel 21 to rotate clockwise and thus take up tape thereby rotating arm 23 clockwise in its effort to eventually reach the newly established null position located somewhere near arm stop 26. Reel 21 continues to take up tape and arm 23 continues to rotate clockwise until the downward extension of line B, defined as the line which passes through the center of rotation of arm 23 perpendicular to the axis of slot 31, intersects the downward extension of the spring 81 axis. According to FIG. 1, this occurs when slot 31 is slightly past the horizontal. Thereafter, the force of spring 81 causes roller 32 to move from its first stable position at end L of slot 31 towards its second stable position at end R of slot 31. Now, once roller 32 has intersected line B, the force of spring 81 causes arm 23 to rotate further towards arm stop 26. During this part of the arm retract sequence, position sensor 27, which includes a limit sensor, provides a limit signal which is applied to AND gate 70. It should be noted that a similar explanation applies to the retract sequence of arm 53, said sequence involving servo amplifier 58, motor 52, reel 51, arm stop 56, slot 61, roller 62, and position sensor 57. When position sensor 57 also provides its limit signal to AND gate 70, power switch 82 is turned OFF. Gate 70 is utilized to assure that during the arm retract sequence, power is not shut off from motors 22 and 52 until both rollers 32 and 62 have intersected lines B and C, respectively. Thereafter, spring 81 provides the torque necessary to continue rotation of arms 23 and 53 until they reach stops 26 and 56, respectively.

Figure 2:
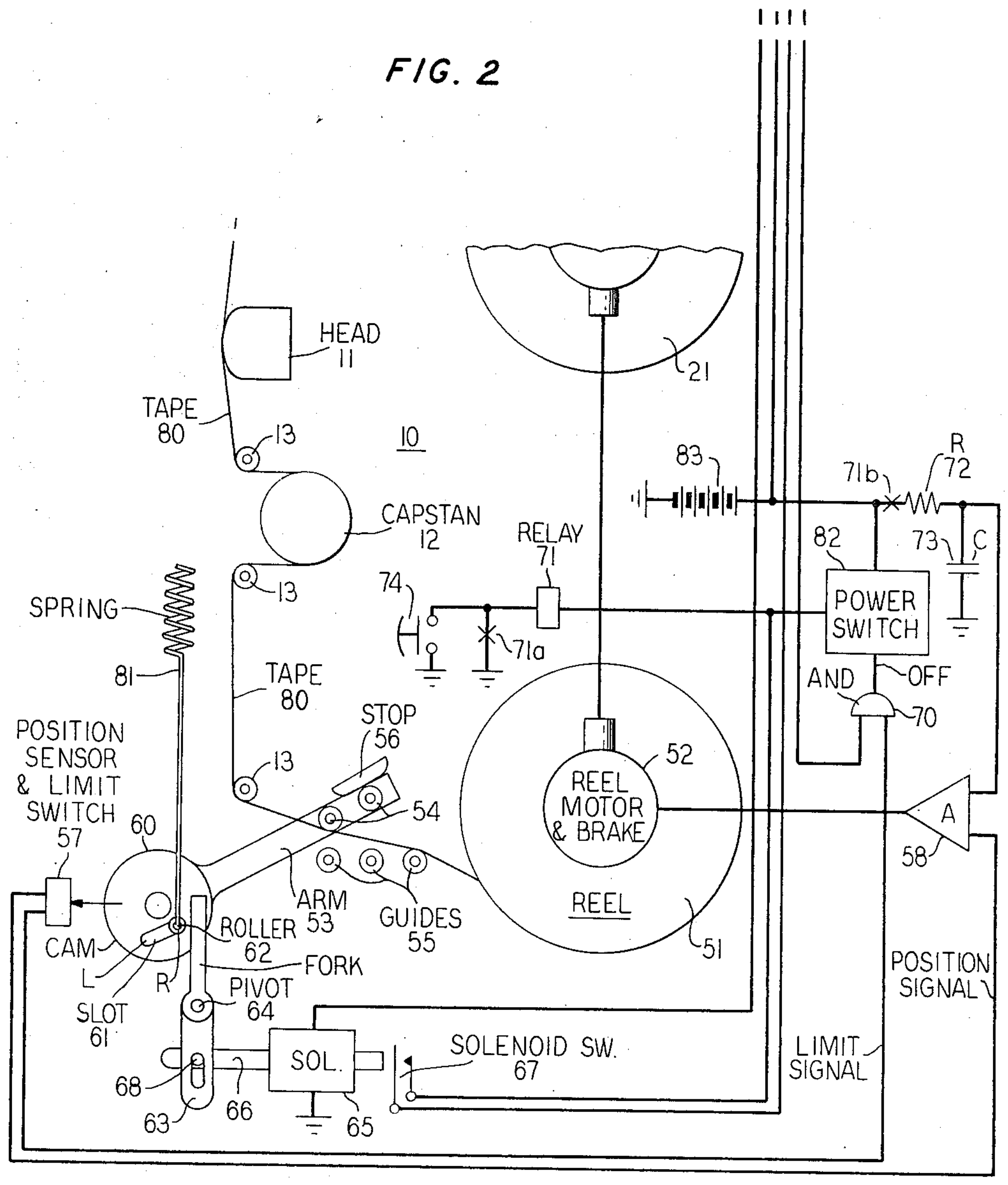
FIG. 2 is a schematic view which shows part of the tape transport of FIG. 1 wherein one of the two fully-retracted multiple-loop tape-storage arms is depicted.

It should be recalled that as long as gate 70 is inoperative, power switch 82 remains turned ON, relay 71 remains latched, and power continues to be applied to motors 22 and 52. However, when gate 70 simultaneously receives limit signals from sensors 27 and 57, power switch 82 is turned OFF thereby de-energizing relay 71 and cutting off power from motors 22 and 52. In addition, brakes 22 and 52 are actuated thereby preventing further reel motion. Spring 81, which during normal operation held arms 23 and 53 in tension, now holds arms 23 and 53 locked or latched against respective arm stops 26 and 56. Rollers 32 and 62 are now at their second stable position located at end R of slots 31 and 61, respectively. FIG. 2 shows arm 53 in the fully retracted position. During the retract sequence both tape-storage devices supply tape to their respective reels.

Tape 80 can now be easily removed from transport 10 since arms 23 and 53 are fully retracted and latched. For instance, assuming that supply reel 21 is almost empty, take-up reel 51 is rotated CCW until all of tape 80 is wound thereon. New tape is now loaded on transport 10 by placing a full supply reel 21 into position, threading the new tape 80 along the appropriate path, and securing the new tape to take-up reel 51. Sufficient tape should initially be taken up by CCW rotation of reel 51 in order to assure proper further operation of transport 10, as will be explained hereinafter.

To return arms 23 and 53 to normal operation about their associated predetermined null positions, a button, not shown, is pressed to close switch 75, see FIG. 1, thereby applying power from battery 83 to solenoids 35 and 65. Referring to FIG. 2 wherein solenoid 65 and its associated components are shown, plunger 66 pulls fork 63, which, in turn, pushes roller 62 in the direction of end L of slot 61 until roller 62 passes line C, which is similar to previously defined line B. Fork 63 has its center of rotation at point 64 and is slidably and rotatably attached to plunger 66 at point 68. Spring 81 now causes arm 53 to rotate CW. Simultaneously, plunger 66 closes switch 67.

A similar explanation applies to the return sequence of arm 23, said sequence involving solenoid 35, plunger 36, roller 32, slot 31, fork 33, and switch 37. Once switches 37 and 67 are closed, power is applied from battery 83 to motors 22 and 52 thereby causing reel 21 to rotate CCW to supply tape to arm 23 and causing reel 51 to rotate CW to supply tape to arm 53. As arm 53 rotates CW and the lower extension of line C intersects the lower extension of spring 81, the force of spring 81 causes roller 62 to move to end L of slot 61. A similar explanation applies to roller 32. Arms 23 and 53 then progressively return to normal operation about their associated predetermined null positions under normal servo control. Rollers 32 and 62, which are now at their initial stable position at end L of slots 31 and 61, respectively, restore full torque to arms 23 and 53 and transport 10 is in normal operation. It should be noted that during the return sequence of tape-storage devices take up tape from their respective reels.

The mechanism of the present invention provides a simple system for automatic loading and unloading of tape from a transport which includes multiple-loop storage arms. The mechanism uses components already existing on the tape transport for normal record-playback functions. Items added to the transport exclusively for the tape load-unload feature are cams 30 and 60 (these may be plates secured to arms 23 and 53) which respectively include slots 31 and 61, rollers 32 and 62, resistor 72 and capacitor 73, AND gate 70, solenoids 35 and 65, plungers 36 and 66, forks 33 and 63, latching relay 71, relay contacts 71*a* and 71*b*, and switches 74, 75, 37 and 67. Relay 71 and contacts 71*a* and 71*b* are convenient but not necessary to the operation of this mechanism. A manual switch placed at the location of contact 71*b* could replace them. No additional latching devices are required to hold the arms locked in the tape loading-unloading position. Thus, spring 81, which provides normal tape tension, also provides the arm latching force. During the retract sequence, the reel motors, which are used during normal operation, provide means for initially rotating the arms after which spring 81 takes over. During the return sequence, the solenoid assemblies move their associated roller past previously defined lines B and C after which the reel servo electronics completes the return operation. Presently available tape transports which include multiple-loop tape-storage arms and which incorporate an automatic tape load-unload feature require additional components, such as a motor, to retract and return the arms.

While the arrangement according to this invention for facilitating the loading and unloading of tape on transports which include multiple-loop tape-storage arms has been described in terms of a specific embodiment, it will be apparent to one skilled in the art that many modifications are possible within the spirit and scope of the disclosed principle.

What is claimed is:

1. In combination with a tape transport including a first tape reel, a first reversible motor for driving said first reel, a first multiple-loop tape-storage arm, a first spring for applying tension to said first arm, and first servo means normally responsive to the angular position of said first arm about its predetermined null position for controlling said first motor, a mechanism for retracting said first arm for tape loading and unloading comprising:

a first cam rotatable with said first arm and including a first elongated slot, a first roller movable within said first slot and attached to the end of said first spring whereby during normal operation of said first arm about its predetermined null position said first roller stably sits at one end of said first slot, means for applying an offset null signal to said first servo means whereby said first motor causes said first reel to withdraw tape from said first arm and whereby said first roller moves from the one end of said first slot to the second end of said first slot, and means for shutting off said first motor when said first arm is substantially at its fully retracted position.

2. The combination of claim 1 wherein said means for applying the offset null signal to said servo means further comprises a power supply, a resistor in series with said power supply, and a capacitor connecting said resistor to ground.

3. The combination of claim 1 further comprising a mechanism for returning said first arm to normal operation about its predetermined null position comprising:

first means for moving said first roller from the second end of said first slot to the one end of said first slot, and means for applying power to said first motor thereby causing said first reel to release tape to said first arm and allowing resumption of normal servo operation.

4. The combination of claim 1 wherein said tape transport further includes a second tape reel, a second reversible motor for driving said second reel, a second multiple-loop tape-storage arm, a second spring for applying tension to said second arm, and second servo means normally responsive to the angular position of said second arm about its predetermined null position for controlling said second motor;

wherein said mechanism which also retracts said second arm for tape loading and unloading further comprises:

a second cam rotatable with said second arm and including a second elongated slot, and a second roller movable within said second slot and attached to the end of said second spring whereby during normal operation of said second arm about its predetermined null position said second roller stably sits at one end of said second slot;

wherein said means for applying an offset null signal also applies the signal to said second servo means whereby said second motor causes said second reel to withdraw tape from said second arm and whereby said second roller moves from the one end of said second slot to the second end of said second slot; and wherein said shutting off means also shuts off said second motor, said shutting off means operating only when said first and second arms are both substantially in their fully retracted position.

5. In combination with a tape transport including a first tape reel, a first reversible motor for driving said first reel, a first multiple-loop tape-storage arm, a first spring for applying tension to said first arm, and first servo means normally responsive to the angular position of said first arm about its predetermined null position for controlling said first motor, a mechanism for returning said first arm from its fully retracted position to normal operation about its predetermined null position comprising:

a first cam rotatable with said first arm and including a first elongated slot, a first roller movable within said first slot and attached to the end of said first spring whereby when said first arm is in its fully retracted position said first roller stably sits at the second end of said first slot, first means for moving said first roller from the second end of said first slot to the first end of said first slot, and means for applying power to said first motor thereby causing said first reel to release tape to said first arm and allowing resumption of normal servo operation.

6. The combination of claim 5 wherein said first moving means further comprises a solenoid having a plunger which drives a fork assembly.

7. The combination of claim 6 wherein said means for applying power further comprises a power supply and a first switch which connects said power supply to said first motor upon operation of said solenoid plunger.

8. The combination of claim 5 wherein said tape transport further includes a second tape reel, a second reversible motor for driving said second reel, a second multiple-loop tape-storage arm, a second spring for applying tension to said second arm, and second servo means normally responsive to the angular position of said second arm about its predetermined null position for controlling said second motor;

wherein said mechanism which also returns said second arm to normal operation about its predetermined null position further comprises:

a second cam rotatable with said second arm and including a second elongated slot, a second roller movable within said second slot and attached to the end of said second spring whereby when said second arm is in its fully retracted position said second roller stably sits at the second end of said second slot, and second means for moving said second roller from the second end of said second slot to the first end of said second slot; and wherein said power applying means also applies power to said second motor, said power applying means operating only after said first and second moving means are fully operative.

* * * * *